United States Patent
Koide (10) Patent No.: US 7,363,836 B2
(45) Date of Patent: Apr. 29, 2008

(54) SHIFT LEVER APPARATUS

(75) Inventor: Tamaki Koide, Nisshin (JP)

(73) Assignee: Kojima Press Industry Co., Ltd., Toyota-shi (JP)

( * ) Notice: Subject to any disclaimer, the term of this patent is extended or adjusted under 35 U.S.C. 154(b) by 216 days.

(21) Appl. No.: 10/849,299

(22) Filed: May 20, 2004

(65) Prior Publication Data

US 2004/0237693 A1    Dec. 2, 2004

(30) Foreign Application Priority Data

May 26, 2003    (JP) ............................. 2003-147396

(51) Int. Cl.
*B60K 20/00*    (2006.01)
*F16H 59/04*    (2006.01)
(52) U.S. Cl. .................. 74/473.33; 74/473.1; 74/473.3
(58) Field of Classification Search ............... 74/473.1, 74/473.18, 473.3, 473.33, 471 XY
See application file for complete search history.

(56) References Cited

U.S. PATENT DOCUMENTS

| | | | | | |
|---|---|---|---|---|---|
| 3,800,337 | A | * | 4/1974 | Mizelle | ............................. 5/43 |
| 4,132,124 | A | * | 1/1979 | Iida | ........................... 74/473.34 |
| 5,022,281 | A | * | 6/1991 | Heizmann | ................... 74/473.1 |
| 5,182,961 | A | * | 2/1993 | Menahem et al. | ..... 74/471 XY |
| 5,899,115 | A | * | 5/1999 | Kataumi et al. | ......... 74/473.18 |
| 6,148,686 | A | * | 11/2000 | Kataumi | ................... 74/473.18 |
| 2002/0073796 | A1 | * | 6/2002 | Ruckert et al. | ........... 74/473.33 |
| 2003/0151806 | A1 | * | 8/2003 | Schmidt et al. | ............. 359/384 |
| 2004/0035239 | A1 | * | 2/2004 | Bohm | ......................... 74/512 |

FOREIGN PATENT DOCUMENTS

| | | |
|---|---|---|
| EP | 0 358 894 A | 3/1990 |
| EP | 1 213 509 A | 6/2002 |
| GB | 1 402 662 A3 | 8/1975 |
| JP | 63-005520 | 1/1988 |
| JP | A 11-227484 | 8/1999 |
| WO | WO 99/32316 A | 7/1999 |

OTHER PUBLICATIONS

Marks' Standard Handbook for Mechanical Engineers, McGraw-Hill, 10th edition, 1996, p. 8-3.*
Brown, Henry T., Five Hundred and Seven Mechanical Movements, 18th Edition, p. 80 and 81, 1868.*

* cited by examiner

*Primary Examiner*—Thomas R. Hannon
*Assistant Examiner*—Justin Krause
(74) *Attorney, Agent, or Firm*—Kenyon & Kenyon LLP (57) ABSTRACT

A shift lever apparatus includes a base member, a shift lever, and one or more planar four-bar linkage mechanisms supporting the shift lever so as to be movable relative to the base member. The four-bar linkage mechanism includes four link elements including a base-side link element, a lever-side link element, and a pair of connecting link elements. The shift lever is supported by the lever-side link element, and the base member supports the base-side link element. The four-bar linkage mechanism includes an operational plane in which the four link elements conduct a link motion. The lever-side link element is parallelly or substantially parallelly shiftable in the operational plane relative to the base member so that the shift lever can shift parallelly or substantially parallelly in the operational plane relative to the base member.

8 Claims, 4 Drawing Sheets

SHIFT LEVER APPARATUS

BACKGROUND OF THE INVENTION

1. Field of the Invention

The present invention relates to a shift lever apparatus of a vehicle.

2. Description of Related Art

Japanese Patent Publication HEI 11-227484 discloses a sequential type shift lever apparatus including a first shift lever path in which P, R, N and D (Parking, Reverse, Neutral and Drive) positions are arranged in a zigzag manner and a second shift lever path in which M (Manual), + and − positions are provided.

The shift lever apparatus includes a base member and a shift lever which is movable relative to the base member. The shift apparatus further includes a gate member having the shift lever paths through which the shift lever extends. The gate member regulates a pattern of movement of the shift lever to a pattern of the shift lever paths. The shift lever is rotatable about a first rotational axis relative to the base member in a shift direction and is rotatable about a second rotational axis relative to the base member in a select direction perpendicular to the shift direction. Since the shift lever rotates in the shift direction and the select direction, when shifted, an inclination of the shift lever changes and a shift knob provided at an upper end of the shift lever moves in an arc both in the shift direction and the select direction.

Figure 5:
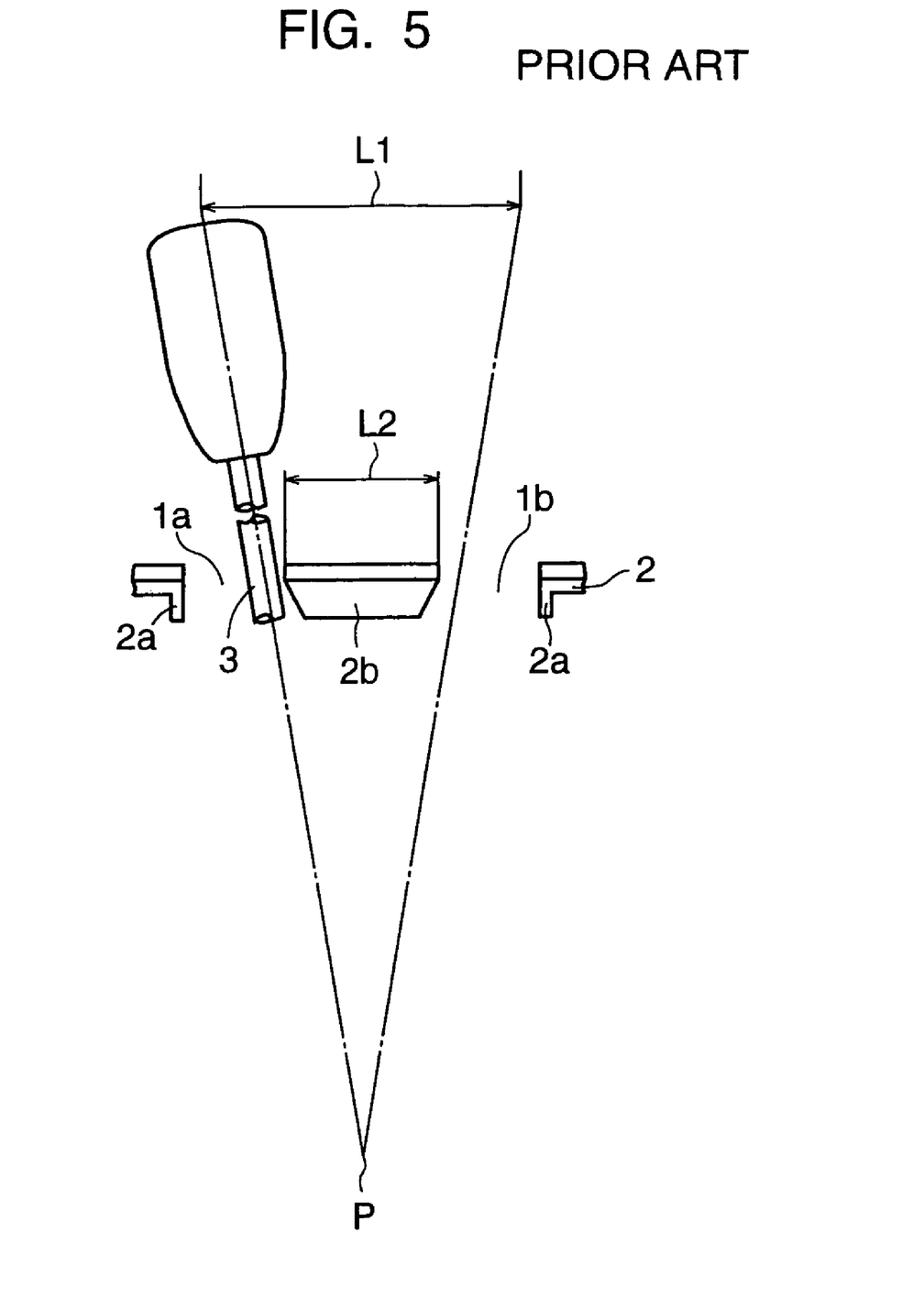
FIG. 5 is a cross-sectional view of a gate member and its vicinity of a comparison shift lever apparatus, viewed in the same direction as that of FIG. 3.

The above-described shift lever apparatus has the following problems:

As illustrated in FIG. 5 illustrating a portion of a shift lever apparatus of comparison for explanation of the problems of the above-described shift lever apparatus, since the shift lever 3 rotates, an operational feeling of the shift lever is not good compared with a parallelly shiftable shift level Further, since the shift lever 3 rotates about the second rotational axis P in the select direction, when the movement amount of the shift knob in the select direction is set to a relatively small amount (L1) for obtaining a good operational feeling of the shift knob, a portion of the gate member 2a located between a first path portion 1a and a second path portion 1b of the shift path (an intermediate wall 2b) is reduced in width to a width L2 to prevent the intermediate member from interfering with the shift lever which inclines during rotation. As a result, it is difficult to obtain a sufficient strength of the intermediate wall 2b.

For decreasing the inclination of the shift lever in the rotational movement of the shift lever about the rotational axis, it will be effective to lower the rotational axis of the shift lever. However, such lowering of the rotational axis will increase a size of the shift lever apparatus in a vertical direction, which makes difficult mounting of the shift lever apparatus to a vehicle.

SUMMARY OF THE INVENTION

An object of the present invention is to provide a shift lever apparatus where a shift lever can be parallelly shifted in at least one direction without rotating.

Another object of the present invention is to provide a shift lever apparatus where, without increasing a size of a shift lever apparatus in a vertical direction, a shift lever can be shifted in at least one direction without rotating about a rotational axis in the direction.

A shift lever apparatus according to the present invention for achieving the above-described object includes a base member, a shift lever, and at least one (one or more) planar four-bar linkage mechanism (hereinafter, four-bar linkage mechanism) supporting the shift lever from the base member so as to be movable relative to the base member.

The four-bar linkage mechanism includes four link elements (bars) including a base-side link element, a lever-side link element opposing the base-side link element, and a pair of connecting link elements connecting the base-side link element and the lever-side link element. The shift lever is supported by the lever-side link element, and the base member supports the base-side link element.

The four-bar linkage mechanism includes an operational plane in which the four link elements conduct a link motion. The lever-side link element is parallelly or substantially parallelly shiftable in the operational plane relative to the base member.

The four-bar linkage mechanism includes four connecting portions connecting the lever-side link element, the base-side link element and the pair of connecting link elements to each other. Preferably, each of the four connecting portions has a rotational axis, and all of the rotational axes of the four connecting portions are parallel to each other.

Preferably, the base-side link element and the lever-side link element are parallel to each other, and the pair of connecting link elements are parallel to each other.

Preferably, the operational plane of the four-bar linkage mechanism is movable in a direction perpendicular to the operational plane. The movement of the operational plane of the four-bar linkage mechanism may be a parallel shift motion or a rotational motion.

For example, the base-side link element includes a rotational axis, and the operational plane of the four-bar linkage mechanism is rotatable about the rotational axis of the base-side link element in a plane perpendicular to the operational plane.

Preferably, the four-bar linkage mechanism includes an operational plane in which the four link elements conduct a link motion, and the base-side link element includes a rotational axis so that the operational plane of the four-bar linkage mechanism is rotatable about the rotational axis of the base-side link element in a plane perpendicular to the operational plane. By this structure, the shift lever is able to shift its position parallelly without changing its inclination relative to the base member in the operational plane of the four-bar linkage mechanism and the shift lever is able to rotate about the rotational axis of the base-side link element in the plane perpendicular to the operational plane of the four-bar linkage mechanism.

Preferably, the base member includes a gate member including a shift lever path through which the shift lever extends. The shit lever path includes two path portions extending parallel to each other. The gate member includes an intermediate wall located between the two path portions, and the intermediate wall has opposite side surfaces parallel to each other.

At least one of the pair of connecting links may be curved.

Preferably, the base member has a surface having a plurality of concave portions spaced from each other for causing an irregular feeling to motion of the shift lever at the concave portions. A cylinder portion is provided to a link element of the four-bar linkage mechanism, and a pin is slidably inserted in the cylinder portion. The pin is biased by a spring against the surface of the base member.

According to the present invention, the following technical advantages are obtained:

Since the shift lever apparatus is provided with one or more four-bar linkage mechanisms, a motion of the shift lever in the operational plane of the four-bar linkage mechanism is changed from a rotational motion of the comparison shift lever apparatus to a parallel or substantially parallel shift motion. As a result, an operational feeling of the shift lever is improved compared with that of the rotational shift lever of the comparison shift lever apparatus, because the parallelly shiftable shift lever does not give a moment or a twisting force to a hand holding a shift knob.

Further, since the shift lever is parallelly shifted, even if a shift amount of the shift knob is maintained to the same amount (L1 of FIG. 3) as that of the shift knob of the comparison shift lever apparatus, a width of a portion of the gate member located between two shift lever path portions (an intermediate wall between the two shift lever path portions) is increased to a great extent compared with the width (L2 of FIG. 5) of the intermediate wall of the comparison shift lever apparatus.

Further, since the four-bar linkage mechanism includes four link elements including the base-side link element, the lever-side link element opposing the base-side link element, and the pair of connecting link elements connecting the base-side link element and the lever-side link element, and the shift lever is supported by the lever-side link element and the base member supports the base-side link element, the shift lever can be parallelly or substantially parallelly shifted in the operational plane of the four-bar linkage mechanism, without being rotated.

Since the four-bar linkage mechanism includes an operational plane in which the four link elements conduct a link motion, and the lever-side link element is parallelly or substantially parallelly shiftable in the operational plane relative to the base member, the shift lever is parallelly shiftable in the operational plane relative to the base member.

Further, since the four-bar linkage mechanism includes the four connecting portions connecting the lever-side link element, the base-side link element and the pair of connecting link elements to each other, and in a case where all of the rotational axes of the four connecting portions are parallel to each other, the four link elements can move relative to each other in the operational plane only which is perpendicular to all of the rotational axes of the four connecting portions.

Further, in a case where the base-side link element and the lever-side link element are parallel to each other and the pair of connecting link elements are parallel to each other, a posture of the shift lever during movement in the operational plane is maintained constant in direction. As a result, an operational feeling of the shift lever is improved compared with the comparison shift lever apparatus where the direction of the shift lever changes during rotational motion thereof.

Further, the operational plane of the four-bar linkage mechanism is movable in a direction perpendicular to the operational plane. The movement of the operational plane in the direction perpendicular to the operational plane may be a parallel shift or a rotational motion.

In a case where the base-side link element includes a rotational axis and the operational plane of the four-bar linkage mechanism is rotatable about the rotational axis of the base-side link element in a plane perpendicular to the operational plane, an operational feeling improvement of the shift lever due to the parallel shift motion of the operational plane is obtained in a direction along the operational plane only, and an operational feeling of the shift lever in the direction perpendicular to the operational plane is the same as that of the rotational shift lever of the comparison shift lever apparatus.

In a case where the four-bar linkage mechanism includes an operational plane in which the four link elements conduct a link motion, and the base-side link element includes a rotational axis so that the operational plane of the four-bar linkage mechanism is rotatable about the rotational axis of the base-side link element in a plane perpendicular to the operational plane, the shift lever is able to shift its position parallelly without changing its inclination relative to the base member in the operational plane of the four-bar linkage mechanism, and the shift lever is able to rotate about the rotational axis of the base-side link element in the plane perpendicular to the operational plane of the four-bar linkage mechanism.

In a case where the base member includes a gate member including a shift lever path which includes two path portions extending parallel to each other and the gate member includes an intermediate wall, located between the two path portions, which has opposite side surfaces parallel to each other, a width, a cross-sectional area and strength of the intermediate wall is increased compared with those of the intermediate wall of the comparison shift lever apparatus.

In a case where at least one of the pair of connecting link elements is curved, interference of the curved connecting link element with other member disposed in the base member will be prevented, though such interference may happen in a straight connecting link element. As a result, disposing the four-bar linkage mechanism within the base member will be easy.

In a case where the base member has a surface for causing an irregular feeling to motion of the shift lever at the concave portions and a pin biased by a spring against the surface of the base member is provided in one link element of the four-bar linkage mechanism, an irregular feeling can be afforded to the motion of the shift lever at the shift positions thereof.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which:

FIGS. 4A-4H are plane views of the various types of shift lever paths with an operational plane of the four-bar linkage mechanism, wherein FIG. 4A is a first gate-type, FIG. 4B is a second gate-type, FIG. 4C is a first sequential-type, FIG. 4D is a second sequential-type, FIG. 4E is a third sequential-type, FIG. 4F is a fourth sequential-type, FIG. 4G is a first gate and sequential composite-type, and FIG. 4H is a second gate and sequential composite-type.

DETAILED DESCRIPTION OF THE PREFERRED EMBODIMENT

As illustrated in FIGS. 1-4H, a shift lever apparatus 10 according to one embodiment of the present invention is a shift lever apparatus of a vehicle.

Figure 4A:
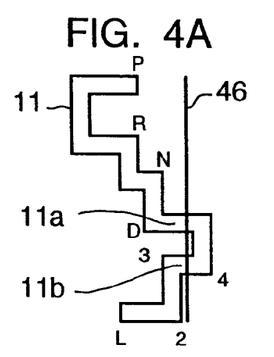
Figure 4B:
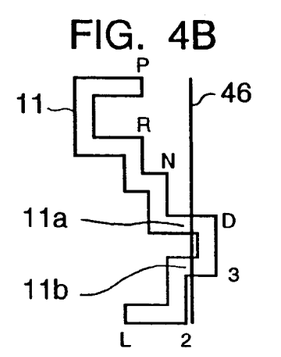
Figure 4C:
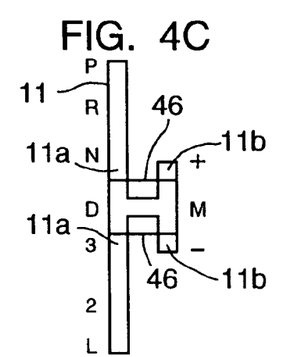
Figure 4D:
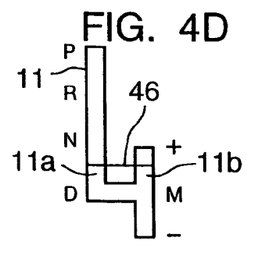
Figure 4E:
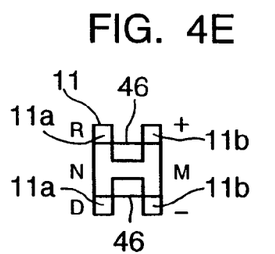
Figure 4F:
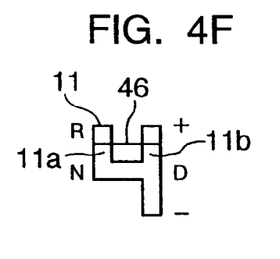
Figure 4G:
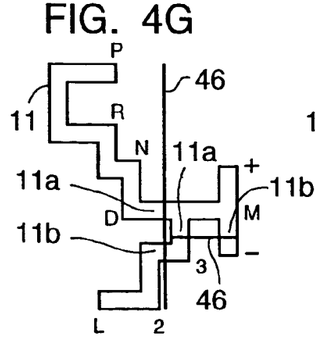
Figure 4H:
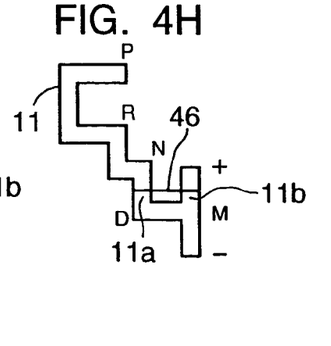

The shift lever apparatus 10 may be a gate-type shift lever apparatus including a single shift lever path 11 formed in a zigzag manner as illustrated in FIGS. 4A and 4B. Alternatively, the shift lever apparatus 10 may be a sequential-type (including a gate and sequential composite-type) shift lever apparatus including a plurality of shift lever paths 11 communicating with each other via a connecting path, where P, R, N and D shift positions are provided on one shift lever path and M, + and − positions are provided on another shift lever path, as illustrated in FIGS. 4C, 4D, 4E, 4F, 4G and 4H.

The shift lever path 11 includes one or more sets of path portions 11a and 11b parallel to each other. In the gate-type shift lever apparatus, the set of parallel path portions 11a and 11b is located in the single shift lever path 11. In the sequential-type shift lever apparatus, the set of parallel path portions 11a and 11b may be located on one of the plurality of shift lever paths 11 or may be located over two shift lever paths 11 such that one path portion 11a is located on one shift lever path and the other path portion 11b is located on another shift lever path.

Figure 1:
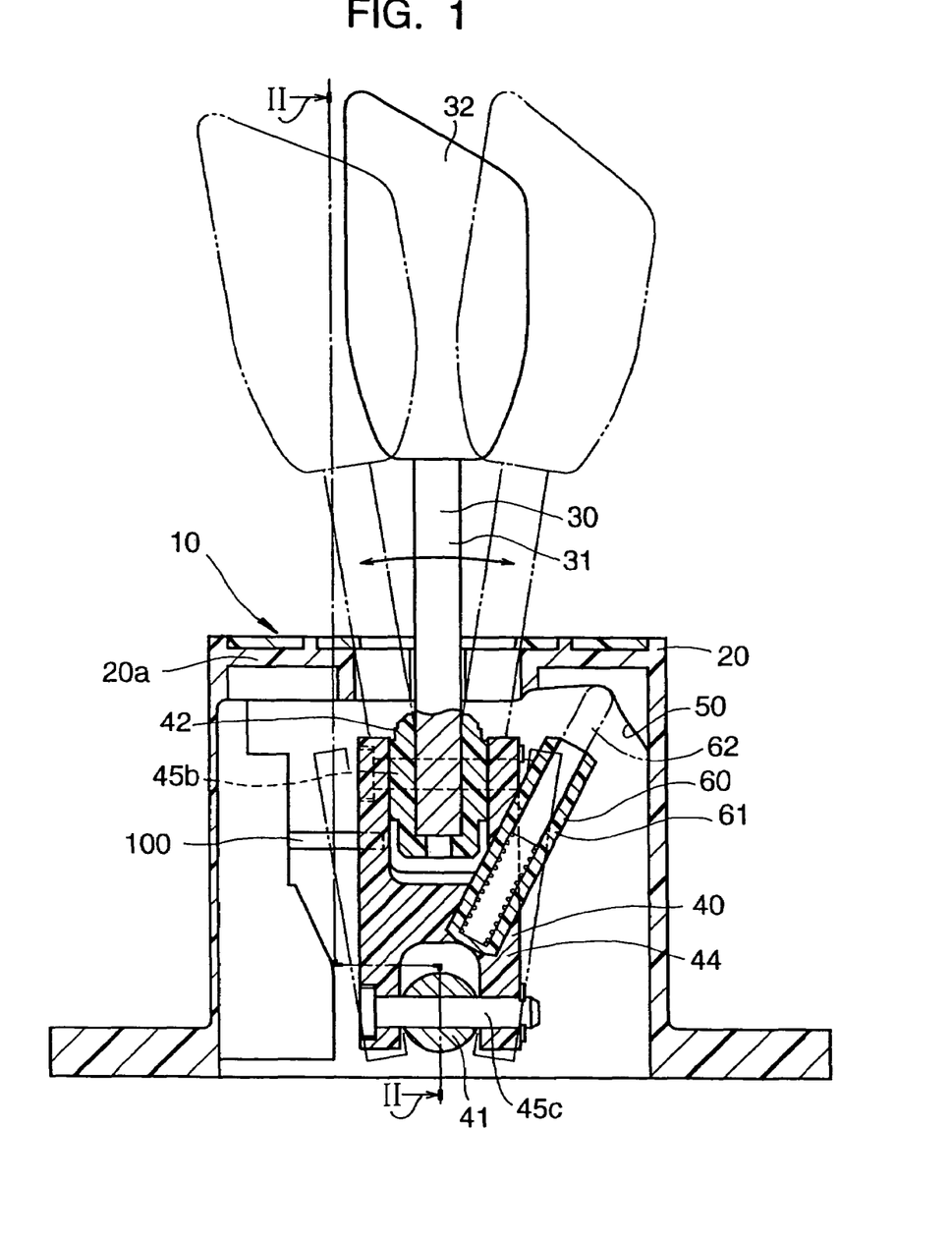
FIG. 1 is a cross-sectional view of a shift lever apparatus according to one embodiment of the present invention, viewed along a plane perpendicular to an operational plane of a four-bar linkage mechanism of the shift lever apparatus.
Figure 2:
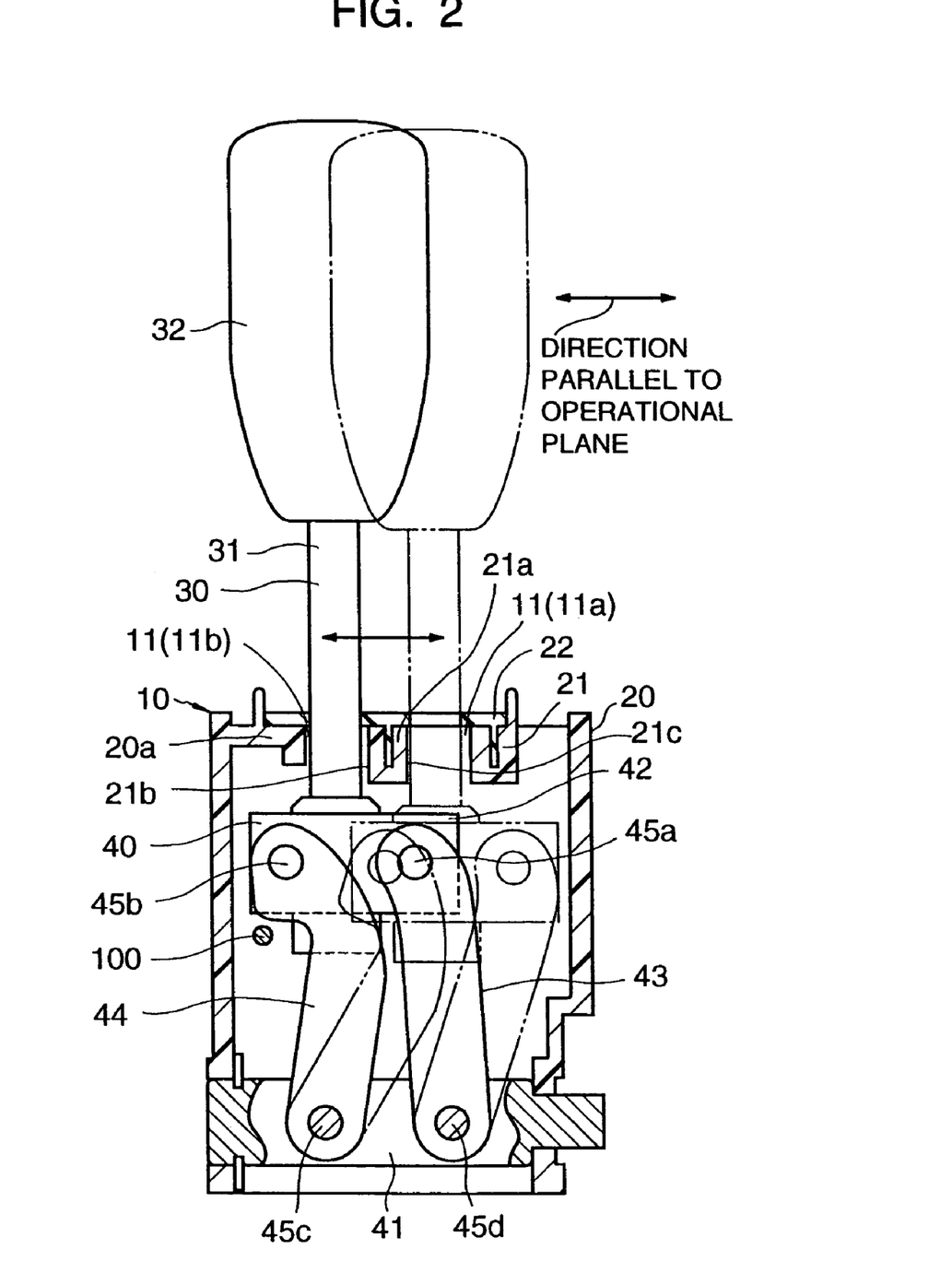
FIG. 2 is a cross-sectional view of the shift lever apparatus according to the embodiment of the present invention, viewed along the operational plane of the four-bar linkage mechanism of the shift lever apparatus.

FIGS. 1 and 2 illustrate a case where a shift lever is parallelly shiftable in a first direction (in an operational plane) by a four-bar linkage mechanism and is rotatable about one rotational axis in a second direction perpendicular to the first direction. However, the present invention is not limited to that case. More particularly, the shift lever may be parallelly shiftable in both a first direction and a second direction perpendicular to the first direction. In the case, two four-bar linkage mechanisms are provided, and the shift lever is supported by a first four-bar linkage mechanism in the first direction and is supported by a second four-bar linkage mechanism in the second direction.

FIGS. 4A-4H illustrate an operational plane 46 of a four-bar linkage mechanism which will be explained below and a relationship between the operational plane 46 and the two shift lever paths 11a and 11b.

Figure 3:
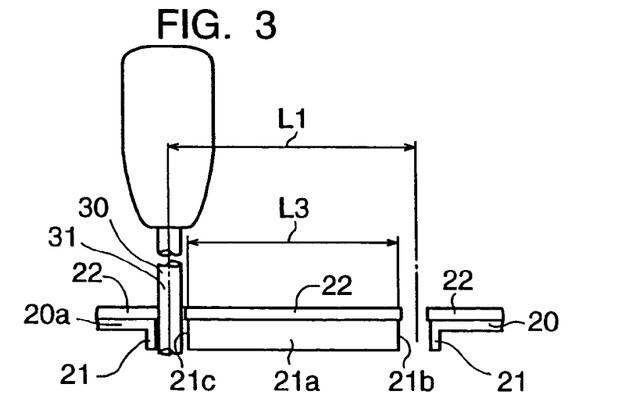
FIG. 3 is a cross-sectional view of a gate member and its vicinity of the shift lever apparatus according to the embodiment of the present invention, viewed along the operational plane of the four-bar linkage mechanism of the shift lever apparatus.

The shift lever apparatus 10 includes a base member 20, a shift lever 30, and at least one (one or more) planar four-bar linkage mechanism 40. The four-bar linkage mechanism 40 has an operational plane 46 (parallel to a plane of FIGS. 2 and 3) in which four link elements of the four-bar linkage mechanism conduct a link motion. The operational plane 46 extends between the two path portions 11a and 11b of the shift lever path 11. FIGS. 1-3 illustrate a case where the shift lever 30 is supported so as to be parallelly shifted in a first direction by the four-bar linkage mechanism 40 from the base member 20 and so as to be rotatable in a second direction perpendicular to the first direction. However, the shift lever support is not limited to FIGS. 1-3, and the shift lever 30 may be supported so as to be able to parallelly shift in a first direction by a first four-bar linkage mechanism and so as to be able to parallelly shift in a second direction perpendicular to the first direction by a second four-bar linkage mechanism. In this case, there are two four-bar linkage mechanisms, and there is no rotational support.

The shift lever apparatus 10 may further include a surface 50 for causing an irregular feeling to motion of the shift lever and a pin 62 biased against the surface 50.

Each component will be explained in more detail below.

The base member 20 is generally made from synthetic resin. The base member 20 is a static member fixed to a body member of the vehicle. The base member 20 may be a single member or an assembly of separate pieces. The base member 20 includes an upper wall 20a to which a gate member 21 and a cushion member 22 are coupled. Each of the gate member 21 and the cushion member 22 construct a portion of the base member 20.

In the gate member 21, the shift lever path 11 is formed. The shift lever 30 extends through the shift lever path 11 and is movable in the shift lever path 11 relative to the gate member 21. The shift lever path 11 may include two path portions 11a and 11b parallel to each other which extend in a direction perpendicular to the operational plane 46 of the four-bar linkage mechanism 40. The gate member 21 includes an intermediate wall 21a which is located between the two path portions 11a and 11b. The intermediate wall 21a includes opposite side surfaces 21b and 21c which are parallel to each other, and a width of the intermediate wall 21a (13 of FIG. 3) is constant in a vertical direction. A shape of a cross-section of the intermediate wall 21a is rectangular. In contrast, the intermediate wall 2b of the comparison shift lever apparatus is trapezoidal, and a shape of the intermediate wall 2b has a cross section having a smaller width at a lower side than at an upper side thereof.

The two parallel path portions 11a and 11b may be, for example, two shift lever paths 11 of a sequential-type shift lever apparatus having a plurality of shift lever paths, or two parallel path portions 11a and 11b of a gate-type shift lever apparatus having a single shift lever path 11 formed in a zigzag-manner. A portion of the gate member 21 between the two path portions 11a and 11b construct the intermediate wall 21a of the gate member 21.

The cushion member 22 is provided for reducing a sound generated when the shift lever 30 collides with the gate member 21. The cushion member 22 protrudes toward the shift lever more than the periphery of the gate member 21 defining the shift lever path, and can collide with the shift lever 30 before the shift lever 30 collides with the gate member 21 whereby the cushion member 22 weakens the shock of the collision when the shift lever 30 collides with the gate member 21. The cushion member 22 may be made from elastomer.

The shift lever 30 extends in an up-and-down direction. The shift lever 30 includes a shift lever shaft portion which may be made from metal and a knob 32 which may be made from synthetic resin.

The shift lever shaft portion 31 may be a hollow pipe or a solid rod. The shift lever shaft portion 31 extends through the shift lever path 11. A lower end of the shift lever shaft portion 31 is located inside of the base member 20 and an upper end of the shift lever shaft portion 31 is located outside of the base member 20.

The knob 32 is coupled to the upper end of the shift lever shaft portion 31. Preferably, a movement range of the knob 32 is small, for example, smaller than the movement range L1 of the comparison shift lever apparatus.

The four-bar linkage mechanism 40 supports the shift lever 30 from the base member 20 via the four-bar linkage mechanism 40 so that the shift lever 30 is movable relative to the base member 20. The four-bar linkage mechanism 40 has four link elements each having an invariable length. Each link element may be made from metal or synthetic resin.

The four link elements of the four-bar linkage mechanism 40 include a base-side link element 41, a lever-side link element 42 opposing the base-side link element 41, and a pair of connecting link elements 43 and 44 connecting the base-side link element 41 and the lever-side link element 42. The shift lever 30 is supported by the lever-side link element 42, and the base member 20 supports the base-side link element 41.

The four-bar linkage mechanism 40 includes an operational plane 46 in which the four link elements 41, 42, 43 and 44 conduct a link motion. The lever-side link element 42 is parallelly or substantially parallelly shiftable in the operational plane 46 relative to the base member 20.

Preferably, the base-side link element 41 and the lever-side link element 42 extend horizontally. The pair of connecting link elements 43 and 44 oppose each other and extend in a direction crossing the base-side link element 41 and the lever-side link element 42. Preferably, the base-side link element 41 and the lever-side link element 42 are parallel to each other and the pair of connecting link elements 43 and 44 are parallel to each other. Preferably, a length of the connecting link element 43 is equal to a length of the connecting link element 44. However, the structure of the four link elements is not limited to the above-described structure. More particularly, the base-side link element 41 and the lever-side link element 42 may be not parallel to each other and the pair of connecting link elements 43 and 44 may be not parallel to each other. A length of the connecting link element 43 may be not equal to a length of the connecting link element 44.

The four-bar linkage mechanism 40 includes four connecting portions 45 (45a, 45b, 45c and 45d) connecting the lever-side link element 42, the base-side link element 41 and the pair of connecting link elements 43 and 44 to each other. Preferably, each of the four connecting portions 45 has a rotational axis, and all of the rotational axes of the four connecting portions 45 are parallel to each other. Due to this structure, the four link elements 41, 42, 43 and 44 are movable in the operational plane 46 only.

Preferably, the operational plane 46 of the four-bar linkage mechanism 40 is movable in a direction perpendicular to the operational plane 46. The movement of the operational plane 46 of the four-bar linkage mechanism 40 may be a parallel shift motion or a rotational motion.

In a case where the movement of the operational plane 46 of the four-bar linkage mechanism 40 is a rotational motion, for example, the base-side link element 41 includes a rotational axis, and the operational plane 46 of the four-bar linkage mechanism 40 is rotatable about the rotational axis of the base-side link element 41 in a plane perpendicular to the operational plane 46.

A structure for rotatably supporting the four-bar linkage mechanism 40 to the base member 20 may be a structure illustrated in FIG. 2, where the base-side link element 41 is rotatably supported by the base member 20, or may be another structure not shown where a shaft is fixed to the base member 20 and the base-side link element is made from a pipe and is supported by the fixed shaft so as to be rotatable about the fixed shaft.

By taking the above-described structure where the four-bar linkage mechanism 40 has the operational plane 46 and the operational plane 46 is rotatable in the plane perpendicular to the operational plane 46, the shift lever 30 shifts parallelly in the operational plane 46 without changing its posture and rotates about the rotational axis of the base-side link element 41 in the plane perpendicular to the operational plane 46.

At least one link element of the pair of connecting link elements 43 and 44 may be curved between the connecting portions at opposite ends of the curved connecting link element, in order to prevent the link element from interfering with a third member 100 within the base member 20.

Preferably, at an inside surface of the upper wall 20a of the base member 20, the base member 20 has a surface 50 having a plurality of concave portions spaced from each other for causing an irregular feeling to motion of the shift lever 30 at the concave portions. A slidable portion 60 which slidably contacts the surface 50 is provided to the four-bar linkage mechanism 40. The slidable portion 60 includes a cylinder portion 61 and a pin 62. The cylinder portion 61 is formed integrally in a link element of the four-bar linkage mechanism 40, and a pin 62 is slidably inserted in the cylinder portion 61. The pin 62 is biased by a spring against the surface 50 of the base member 20.

Operation and technical advantages of the shift lever apparatus 10 will now be explained.

Since the shift lever apparatus 10 is provided with one or more four-bar linkage mechanisms 40, a motion of the shift lever 30 in the operational plane 46 of the four-bar linkage mechanism 40 is changed from a rotational motion to a parallel or substantially parallel shift motion. As a result, the operational feeling of the shift lever 30 is improved compared with the rotational shift lever of the comparison shift lever apparatus.

Further, even if a shift amount of the shift knob 32 is maintained to the same amount (L1 of FIG. 3) as that of the shift knob of the comparison shift lever apparatus, a width (L3 of FIG. 3) of a portion of the gate member 21 located between two shift lever path portions 11a and 11b (an intermediate wall 21a between the two shift lever path portions 11a and 11b) is increased to a great extent compared with the width (L2 of FIG. 5) of the intermediate wall of the comparison shift lever apparatus.

Further, since the four-bar linkage mechanism 40 includes four link elements including the base-side link element 41, the lever-side link element 42 opposing the base-side link element 41, and the pair of connecting link elements 43 and 44 connecting the base-side link element 41 and the lever-side link element 42, and the shift lever 30 is supported by the lever-side link element 42 and the base member 20 supports the base-side link element 41, the shift lever 30 is parallelly or substantially parallelly shiftable in the operational plane 46 of the four-bar linkage mechanism 40, without being rotated.

Since the four-bar linkage mechanism 40 includes an operational plane 46 in which the four link elements 41, 42, 43 and 44 conduct a link motion, and the lever-side link element 42 is parallelly or substantially parallelly shiftable in the operational plane 46 of the four-bar linkage mechanism 40 relative to the base member 20, the shift lever 30 can shift parallelly or substantially parallelly in the operational plane 46 relative to the base member 20. As a result, the operational feeling of the shift lever 30 in the operational plane 46 is improved.

Further, since the four-bar linkage mechanism 40 includes the four connecting portions 45 connecting the lever-side link element 42, the base-side link element 41 and the pair of connecting link elements 43 and 44 to each other, and in a case where all of the rotational axes of the four connecting portions 45 are parallel to each other, the four link elements 41, 42, 43 and 44 can move relative to each other in the operational plane 46 only which is perpendicular to all of the rotational axes of the four connecting portions 45.

Further, in a case where the base-side link element 41 and the lever-side link element 42 are parallel to each other and the pair of connecting link elements 43 and 44 are parallel to each other, a posture of the shift lever 30 during movement in the operational plane 46 is maintained constant in direction so that the shift knob does not give a moment or a twisting force to a driver's hand holding the knob. As a result, an operational feeling of the shift lever 30 is improved compared with the comparison shift lever apparatus where the direction of the shift lever changes during rotational motion thereof.

Further, the operational plane 46 of the four-bar linkage mechanism 40 is movable in a direction perpendicular to the operational plane 46.

In a case where the operational plane 46 parallelly shifts in the direction perpendicular to the operational plane by a second four-bar linkage mechanism, the shift lever 30 parallelly shifts both in the operational plane 46 and in the direction perpendicular to the operational plane.

In a case where the operational plane 46 rotates about the rotational axis of the base-side link element 41 in the direction perpendicular to the operational plane, an operational feeling improvement due to the parallel shift of the shift lever 30 is obtained in a direction along the operational plane 46 only, and the operational feeling of the shift lever 30 is the same as that of the rotational shift lever of the comparison shift lever apparatus.

As illustrated in FIGS. 1-3, in a case where the four-bar linkage mechanism 40 includes an operational plane 46 and the operational plane 46 is rotatable about the rotational axis of the base-side link element 41 in a direction perpendicular to the operational plane 46, the shift lever 30 is able to shift its position parallelly without changing its inclination relative to the base member 20 in the operational plane 46 of the four-bar linkage mechanism 40, and the shift lever 30 is able to rotate about the rotational axis of the base-side link element 41 in the direction perpendicular to the operational plane 46.

Since the base member 20 includes a gate member 21 including a shift lever path 11 which includes two path portions 11a and 11b extending parallel to each other and the gate member 21 includes an intermediate wall 21a, located between the two path portions 11a and 11b, which has opposite side surfaces 21b and 21c parallel to each other, a width (L3), a cross-sectional area and strength of the intermediate wall 21a is increased compared with the width (L2), the cross-sectional area and the strength, respectively, of the intermediate wall of the comparison shift lever apparatus.

In a case where at least one of the pair of connecting link elements is curved, interference of the curved connecting link element with another member disposed in the base member 20 will be prevented, though such interference may happen in a straight connecting link element. As a result, disposing the four-bar linkage mechanism 40 within the base member 20 will be easy.

In a case where the base member 20 has the surface 50 for causing an irregular feeling to motion of the shift lever 30 at the concave portions and a pin 62 biased against the surface 50 of the base member 20 is provided in one link element of the four-bar linkage mechanism 40, an irregular feeling can be afforded to the motion of the shift lever 30 at the shift positions thereof.

Although the present invention has been described above with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A shift lever apparatus comprising:
   a base member;
   a shift lever; and
   at least one planar four-bar linkage mechanism supporting said shift lever so as to be movable relative to said base member, said planar four-bar linkage mechanism being defined by a quadrilateral including four connecting portions which are positioned at respective four corners of a parallelogram, and said four connecting portions being positioned in an operational plane which is rotatable in a direction perpendicular to said operational plane,
   wherein said planar four-bar linkage mechanism includes four link elements including a base-side link element, a lever-side link element opposing said base-side link element, and a pair of connecting link elements connecting said base-side link element and said lever-side link element, said shift lever being supported by said lever-side link element and being fixed to said lever-side link element, preventing relative movement therbetween and said base member supporting said base-side link element
   wherein said base-side link and said lever-side link are straight link elements, said base-side link and said lever-side link being parallel to each other, and at least one of said pair of connecting link elements is a curved link element which is curved so as not to interfere with a member other than said pair of connecting link elements located in the base member.

2. A shift lever apparatus according to claim 1, wherein said lever-side link element is parallelly or substantially parallelly shiftable in said operational plane relative to said base member.

3. A shift lever apparatus according to claim 1, wherein said four link elements conduct a link motion in said operational plane, and said base-side link element is arranged along a rotational axis, said operational plane of said planar four-bar linkage mechanism being rotatable about said rotational axis of said base-side link element in a plane perpendicular to said operational plane, so that said shift lever is able to shift its position parallelly without changing its inclination relative to said base member in said operational plane of said four-bar linkage mechanism, and said shift lever is able to rotate about said rotational axis of said base-side link element in a plane perpendicular to said operational plane of said four-bar linkage mechanism.

4. A shift lever apparatus according to claim 2, wherein said base member includes a gate member including a shift lever path through which said shift lever extends, said shift lever path including two path portions extending parallel to each other, said gate member including an intermediate wall located between said two path portions, said intermediate wall having opposite side surfaces parallel to each other.

5. A shift lever apparatus according to claim 1, wherein said four connecting portions connect said lever-side link element, said base-side link element and said pair of connecting link elements to each other, said four connecting portions each having a rotational axis, all of said rotational axes of said four connecting portions being parallel to each other.

6. A shift lever apparatus according to claim 1, wherein said base-side link element and said lever-side link element are parallel to each other, and said pair of connecting link elements are parallel to each other.

7. A shift lever apparatus according to claim 2, wherein said base-side link element is arranged along a rotational axis, and said operational plane of said planar four-bar linkage mechanism is rotatable about said rotational axis of said base-side link element in a plane perpendicular to said operational plane.

8. A shift lever apparatus according to claim 1, wherein said base member has a surface having a plurality of concave portions spaced from each other, and a cylinder portion is provided to a link element of said four-bar linkage mechanism, a pin being slidably inserted in said cylinder portion, said pin being biased by a spring against said surface of said base member.

* * * * *

UNITED STATES PATENT AND TRADEMARK OFFICE
CERTIFICATE OF CORRECTION

PATENT NO.        : 7,363,836 B2                                              Page 1 of 1
APPLICATION NO.   : 10/849299
DATED             : April 29, 2008
INVENTOR(S)       : Tamaki Koide It is certified that error appears in the above-identified patent and that said Letters Patent is hereby corrected as shown below:

| Column | Line | |
|--------|------|---|
| 6 | 25 | Change "(13 of FIG. 3)" to --(L3 of FIG. 3)--. |

Signed and Sealed this

Fourth Day of August, 2009

JOHN DOLL
*Acting Director of the United States Patent and Trademark Office*